(12) United States Patent
Labaton

(10) Patent No.: US 7,231,025 B2
(45) Date of Patent: Jun. 12, 2007

(54) ACOUSTIC ENCODING OF DYNAMIC IDENTIFICATION CODES

(75) Inventor: Isaac Labaton, Jerusalem (IL)

(73) Assignee: Enco-Tone Ltd., Jerusalem (IL)

( * ) Notice: Subject to any disclaimer, the term of this patent is extended or adjusted under 35 U.S.C. 154(b) by 480 days.

(21) Appl. No.: 10/168,231

(22) PCT Filed: Dec. 19, 2000

(86) PCT No.: PCT/IB00/01989

§ 371 (c)(1),
(2), (4) Date: Jun. 19, 2002

(87) PCT Pub. No.: WO01/45054

PCT Pub. Date: Jun. 21, 2001

(65) Prior Publication Data

US 2002/0191765 A1 Dec. 19, 2002

(30) Foreign Application Priority Data

Dec. 19, 1999 (IL) .................................... 133584

(51) Int. Cl.
*H04M 3/00* (2006.01)
*H04M 1/66* (2006.01)

(52) U.S. Cl. .................... 379/188; 455/410; 455/411

(58) Field of Classification Search ........ 379/188–200, 379/201.01, 88.01, 88.02, 88.04; 380/347, 380/277; 455/403, 410, 411, 563
See application file for complete search history.

(56) References Cited

U.S. PATENT DOCUMENTS

| 5,583,933 | A | | 12/1996 | Mark ..................... 379/357.04 |
| 5,745,555 | A | | 4/1998 | Mark ...................... 379/93.03 |
| 6,026,293 | A | * | 2/2000 | Osborn ....................... 455/411 |
| 6,213,391 | B1 | * | 4/2001 | Lewis .......................... 705/44 |
| 6,607,136 | B1 | * | 8/2003 | Atsmon et al. .............. 235/492 |
| 6,704,715 | B1 | * | 3/2004 | Rosset et al. ................. 705/72 |
| 6,799,155 | B1 | * | 9/2004 | Lindemann et al. ......... 455/558 |

FOREIGN PATENT DOCUMENTS

| DE | 39 22 347 A | 1/1991 |
| EP | 0 451 057 A | 10/1991 |
| FR | 2 753 859 | 3/1998 |
| WO | WO 99/34324 | 7/1999 |

* cited by examiner

*Primary Examiner*—Ovidio Escalante
(74) *Attorney, Agent, or Firm*—Snell & Wilmer L.L.P.

(57) ABSTRACT

Methods for identifying a remote user of a portable device by using the portable device to encode sound corresponding to the identification of the remote user. The sound is received by a microphone external to the portable device and convened to an electrical signal. The electrical signal is transmitted to a processing device, that may be remote to the microphone, where the electrical signal is processed and the identification of the remote user is completed.

12 Claims, 3 Drawing Sheets

ACOUSTIC ENCODING OF DYNAMIC IDENTIFICATION CODES

TECHNICAL FIELD

The present invention relates, generally, to the identification of entities and, more particularly to the identification of entities who perform transactions through devices that are not necessarily phones, such as personal computers, organizers, or the like.

BACKGROUND OF THE INVENTION

The Wireless Telephony Industry is developing the capability to compute secure identification and authentication codes using the cellular phones' Central Processing Units' (CPU) capability or the CPU in a chip card or smart card inserted into the cellular phone. These secure identification and authentication codes can be computed according to different standards and methods, including methods for computing identification or authentication strings that are wholly or partially variable in order to avoid the fraudulent re-use of the string. This industry trend includes the use of the cellular phone to digitally sign documents, according to well-known standards or newly developed standards and protocols.

Many industry leaders plan to use the cellular phone as an instrument for performing e-commerce transactions, whereas the authorized owner of the cellular phone can be identified or authenticated by means of the strings computed as mentioned above, and, whereas certain transaction data is securely transmitted, using encryption methods and/or hash functions Currently, a typical system for identifying the cellular phone owner and certifying transaction data, generates a string of digits or bits which includes, among other data and parameters, the data associated with the identity of the cellular phone or of a chip card inserted in the cellular phone, where the data is totally or partially encrypted. The identification data is sometimes associated with the cellular phone owner, or with another entity, such as an anonymous debit account. The string is typically transmitted as an electromagnetic wave, according to one of several cellular phone methodologies for transmission.

One of the problems with these current systems for secure transactions through the internet is that the transaction must be performed at some instance through the cellular phone, in conjunction with a cellular phone call, thus adding complexity and time to the transaction.

As an example, a first e-commerce transaction is initiated and completed through the cellular phone, whereas at a particular moment the cellular phone generates the identification string and transmits an electromagnetic representation of the identification string. This is the typical case where the holder of the cellular phone places a call using the cellular phone.

Now, another example that shows the shortcomings of the prior art is when an e-commerce transaction is initiated through a device other than a cellular phone, such as a PC. At some point in time during the carrying out of the e-commerce transaction, the owner of the cellular phone, due to the need to certify his acceptance of the transaction, will need to use a cellular device to generate the identification or certification string. But, since the owner of the cellular phone is communicating with the e-merchant by means of his PC, an extra step will have to take place where either the owner is called by the merchant, or in other cases, the owner places a call to the merchant or other entity with the cellular phone. In either case, however, the owner always transmits the certification string using his cellular phone, in the form of an electromagnetic wave.

Therefore, there is a need for a new methodology, which will enable the identification and certification for remote transactions in general, including telephone orders, and the e-commerce transaction in particular, which are made though a PC, or any other device such as regular wired phones, organizers, palm computers and the like, without the necessity of placing a call with the cellular phone in which the capability to compute identification/certification strings has been installed.

SUMMARY OF THE INVENTION

The method and system of this invention is designed for solving the identification problems of entities who use devices other than cellular phones in order to perform remote transactions.

The method and system utilizes the encoding of the identification/authentication/certification string, computed in the cellular phone, as described above or in any other portable device such as a personal digital assistant (PDA), other organizers, and the like, into acoustic waves (i.e. sound waves), in a way that the acoustic waves will carry the information encoded in the string to a microphone external to the cellular phone, such as a PC microphone, or a regular, wired phone-set microphone.

Once the sound wave reaches the external microphone, the sound wave can be converted into an electrical signal, which can be digitized and later decoded into the original string. The decoded string can now be transmitted through telephone lines, data lines, internet lines or any other similar technology used for data transmission.

As a result, the owner of the cellular phone in which the method of this invention has been installed, can perform a secure remote transaction from any PC, by using the PC in a conventional way to process an e-commerce transaction, and when the time comes to send the cellular phone's computed identification string, the cell phone owner can attach the cellular phone in which the method of this invention has been installed, to the PC microphone, and then activate the computation of the identification string. The cellular phone, in which the method of this invention has been installed, will compute the identification string, and then encode it into sound. This acoustic message will reach the PC microphone, and eventually will be converted into an electrical signal (analog signal), which can be digitized and later decoded back into the original string.

This string can be transmitted to a remote computer system for processing, and eventually used for identification and authentication. This remote computer system can, in turn, send a certificate to the pertinent entity, like the merchant, authentication server or the like.

BRIEF DESCRIPTION OF THE DRAWING FIGURES

DETAILED DESCRIPTION

The present invention may be described herein in terms of functional block components and processing steps. It should be appreciated that such functional blocks may be realized by any number of hardware or software components configured to perform the specified functions For example, the present invention may employ various software components, e.g., logic elements, database tables, look-up tables, and the like, which may be used to carry out a variety of functions under the control of one or more microprocessors or other control devices. In addition, those skilled in the art will appreciate that the present invention may be realized in a software or computer program context in conjunction with any number of conventional computer system environments. Furthermore, the present invention is not limited to the process flows described herein, as any process flow or rearrangement of process steps which captures the features of the present invention is considered to be within the scope of the present invention. It should be noted that the present invention may employ any number of conventional techniques for processing steps such as database storing and retrieving, displaying text and graphics, printing output, sending files, and the like. Such general techniques that may be known to those skilled in the ar are not described in detail herein.

It should be appreciated that the particular implementations and processes shown and described herein are illustrative of the present invention and its best mode and are not intended to otherwise limit the scope of the present invention in any way. Indeed, for the sake of brevity, conventional software programming techniques may not be described in detail herein.

Figure 1:
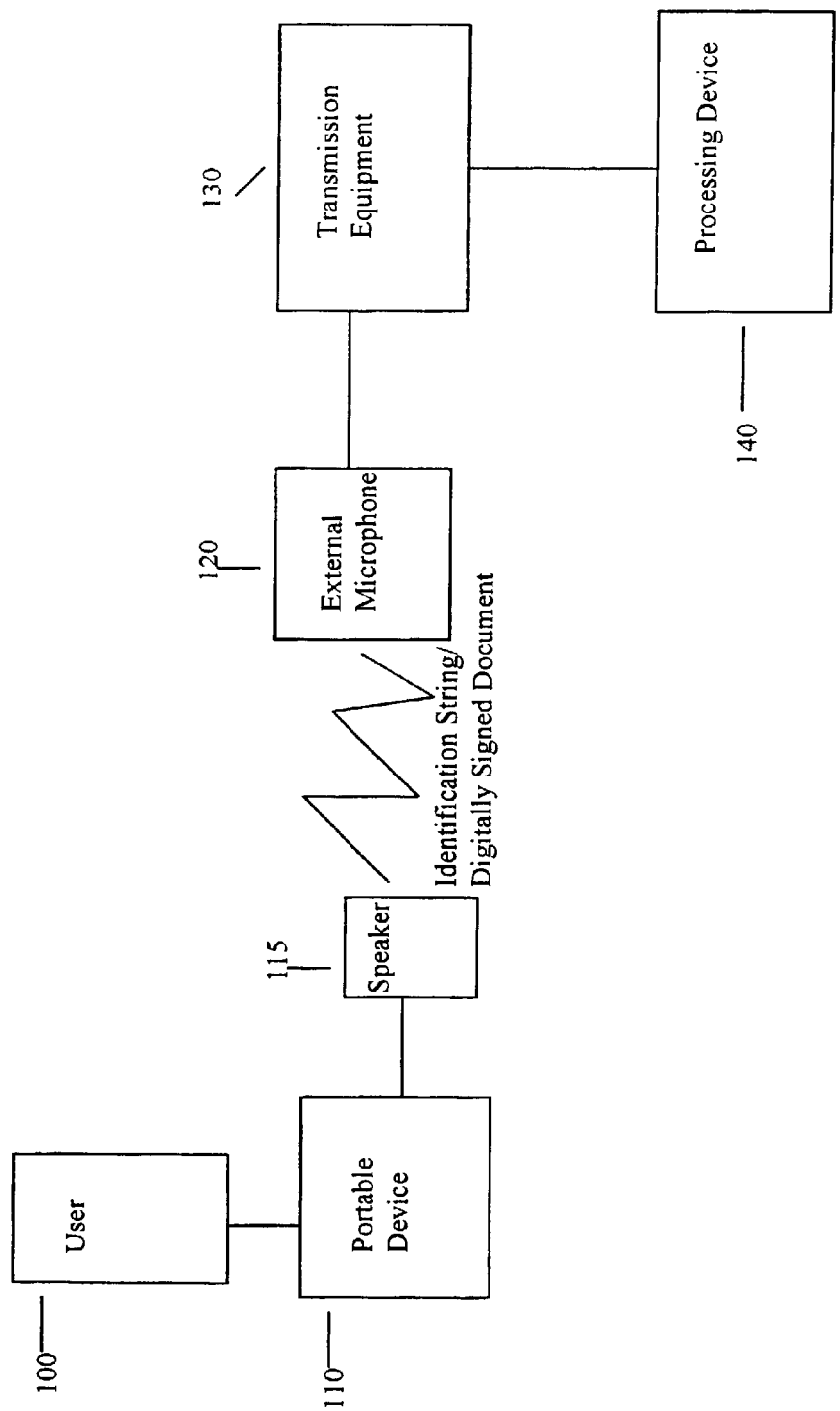
FIG. 1 is a block diagram of an exemplary system for performing the methods of the present invention.

As previously discussed and referring now to FIG. 1, there is a need for a new method which will enable the identification of a remote person 100 and the certification of transaction data by using a cellular phone 110 in which the capabilities of computing identification strings has been installed, but not necessarily through the use of the cellular phone as a phone, but instead, by separating or dissociating the function of the cellular phone as a phone from the function of the cellular phone as a certification/identification tool. This dissociation can be accomplished according to the method presented here.

The importance of such a dissociation becomes evident when there is a need to certify a remote transaction through another phone such as a regular wired phone, through a PC, or through any device other than the cellular phone for remote transactions such as e-commerce transactions, telephone orders, or access to remote databases.

With continued reference to FIG. 1, the method of this invention comprises the encoding of the identification/authentication/certification string, computed in cellular phone 110 into acoustic waves using the cellular phone speakers 115, in a way that the acoustic waves will carry the information encoded in the string to a microphone 120 external to the cellular phone, such as a PC microphone, or a regular, wired phone-set microphone, a microphone attached to a point of sale (POS) terminal, or another microphone external to the cellular phone.

Once the sound wave reaches external wired phone microphone 120, or the microphone attached to the PC, the acoustic message is converted into an electrical signal, which can be digitized and later decoded into the original string.

Now, this electrical signal can be transmitted through telephone lines, data lines, internet lines, or via any other transmission technology 130 to a remote computer system 140 which will in turn process the received signal into the original string and the transaction data can be identified and certified.

Figure 2:
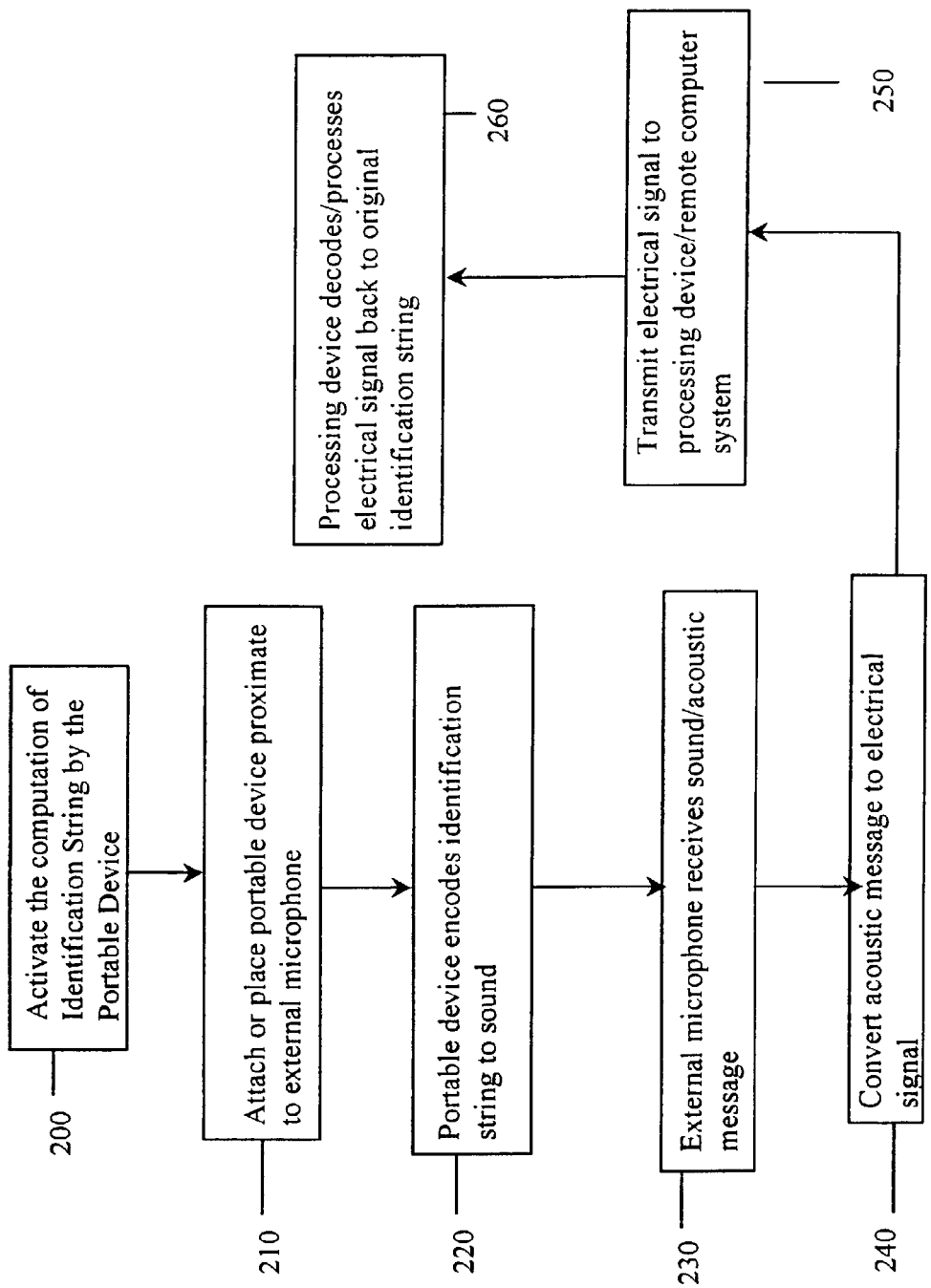
FIG. 2 is an exemplary flow diagram of an embodiment of the methods of the present invention.

As a result, the user of cellular phone 100 in which the method of this invention has been installed, can perform a secure remote transaction from any PC, by using the PC in a conventional way to process an e-commerce transaction, and when the time comes to identify and certify the transaction data, the user can use the cellular phone for these purposes, without placing a separate call with the cellular phone. Referring now to FIG. 2, this process is initiated by activating the computation of the identification string (step 200) by cellular phone 100 by entering a secret personal identification (PIN) into the cellular phone, in order to avoid unauthorized use of such identification capabilities. It will be appreciated that entering the PIN is optional and may not be required by different embodiments of the present invention. Next, the user attaches or places the cellular phone proximate to the PC microphone (step 210), and cellular phone 110, in accordance with the present invention will compute the identification string and then will encode it into sound (step 220). It will be appreciated that the PC microphone can be replaced by any other external microphone as described above. Alternatively, the user can use the cellular phone to display all or part of the identification string to be used as a one time password. The acoustic message will be received by external microphone 120 (step 230), and will be converted into an electrical signal (analog signal) (step 240), which can be digitized and transmitted by the PC or other transmission technology 130 to remote computer system 140 (step 250). The remote computer system receives the electrical signal and may decode the received signal into the original string (step 260) in order to identify the sender and certify the transaction data that was entered. As a result of this method, the cellular phone was not used in the normal manner of a phone.

In accordance with further aspects of the present invention, there is the additional capability to use a cellular phone in which the method of this invention has been installed as an instrument for certification of certain sensitive transaction data, such as the transaction amount, whereas the data can be keyed-in into the cellular phone in which the method of this invention has been installed and there, the data will be encrypted according to specific standards, and the final string converted into sound to be inputted into an external microphone.

Another example involves the use of the cellular phone in which the method of this invention has been installed as an identification/certification tool for completing bank or brokers remote transaction, by means of PC's or other devices in the above mentioned way.

In accordance with a further aspect of the present invention, the cellular phone in which the method of this invention has been installed can used as an identification/certification tool to be used through other devices' microphones, for on-the-spot transactions, whereas the holder of the cellular phone is physically present at the store or proximate a special transaction machine such as a vendor machine or an ATM. Assuming there is a microphone external to the cellular phone connected to the POS machine or to the other store or automatic machine, the holder of cellular phone 110 in which the method of this invention has been installed, can use the cellular phone as an identification or certification tool to be used in conjunction with other devices' microphones. This process may be initiated by entering a PIN on cellular phone 110, and if desired, by entering transaction data, and finally affixing the cellular phone to external microphone 120, and sending the computed string encoded to sound, as an acoustic message for further processing into machine 140 attached to the external microphone or any other machine connected in one way or another to such machine.

In this way, the cellular phone in which the method of this invention has been installed can also be used as an identification/certification tool, via Point of Sale (POS) or other on-the-spot transactions.

An additional example of the potential applications of the cellular phone in which the method of this invention has been installed is the use of the cellular phone as the instrument to pay for so-called micro-transactions, or e-purse, e-wallet, debit applications where in the act of payment, the string computed in the cellular phone or in any other place, and transmitted to such cellular phone, will be converted into acoustic waves by the cellular phone, to be entered into a microphone external to the cellular phone.

In accordance with a further aspect of the present invention, in which the cellular phone can be used through other devices' microphones as an identification/certification tool, is to use the cellular phone as an access instrument to gain access to corporation's intra-nets, corporations' databases, and other restricted web-sites and computer networks and to use a microphone external to the cellular phone to input the identification/authentication/certification string computed in cellular phone and converted into sound by the cellular phone.

In accordance with further aspects of the present invention, a cellular phone in which the method as described above has been installed enabling it to be an identification/ certification tool to be used also through other devices' microphones, which is as before but with biometrics methods of identifying or authenticating the holder, such as reading and checking a finger-print or a voice-print or other biometrics parameter of the holder as part of the process of identifying the authorized owner.

In accordance with the present invention, a method is provided that enables the identification and authentication of either a user of a smart card or other similar chip-card inserted into the cellular phone or of the user of the cellular phone itself. This method may be facilitated by a software module installed on the cellular phone's CPU or on the smart card and the software module may be used to compute a digital string, preferably totally variable, or at least partially variable. This string is further encoded into an analog wave and as a result, the cellular phone generates, as sound, by means of a speaker, an acoustic wave, and the acoustic wave is input into a microphone external to the cellular phone, and re-converted into an analog wave. The analog wave may be decoded into the original string and the decoded string may be processed in order to identify the cellular phone or the chip-card inserted into the cellular phone or the authorized owner or user of the cellular phone, and the identification process may be accomplished in the device attached to the microphone external to the cellular phone, or the string may be transmitted by the device to a remote computer system through the internet, a public switched telephone network (PSTN), or any other similar transmission media, in order to cause the string to be processed for completing the identification as above. Alternatively, the software module be downloaded through the Internet.

Figure 3:
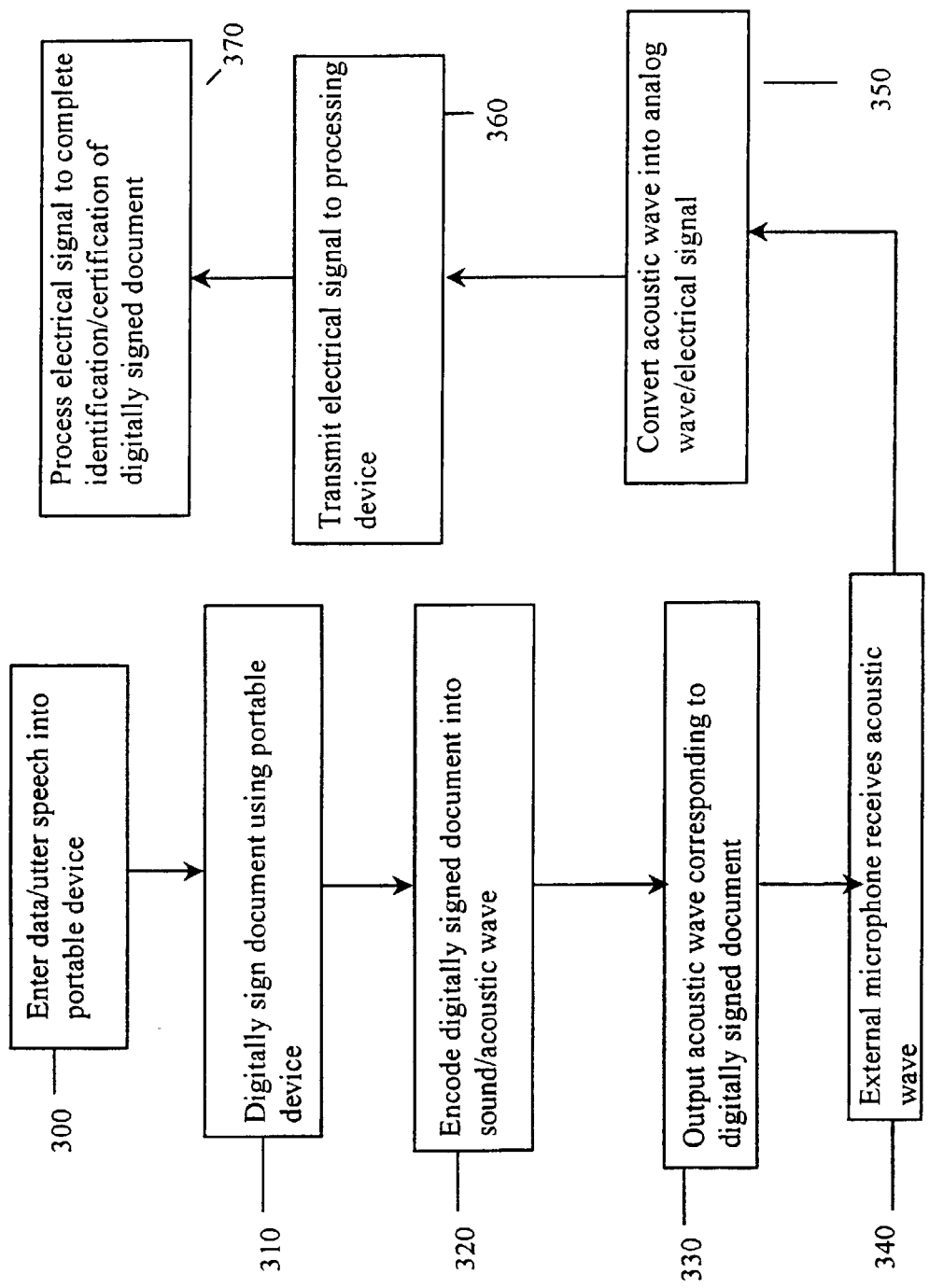
FIG. 3 is an exemplary flow diagram of another embodiment of the methods of the present invention.

With reference now to FIG. 3, in accordance with another aspect of the present invention, data may be entered into the cellular phone using the cellular phone's keypad to key in data (step 300). Alternatively, a cellular phone user may utter speech and the utterance may be converted to text by means of standard speech recognition techniques installed in the cellular phone. In either case, the entered data is referred to as a document, and the document may be digitally signed by use of the cellular phone's CPU (step 310) in accordance with presently known or yet to be developed methodologies.

Once the document is entered, the document can be digitally signed and the document and the digital signature may be referred to as the digitally signed document. The digitally signed document is encoded into an analog wave (step 320) and as a result of that conversion the cellular phone generates, as sound, by means of a speaker, an acoustic wave (step 330), and the acoustic wave is input into an external-to-the-cellular phone microphone (step 340), and re-converted into an analog wave (step 350), which is de-codified into the original digitally signed document, and whereas the digitally signed document is processed (referred heretofore as decryption process) in order to identify the cellular phone owner and/or recuperate the data.

This decryption process can be accomplished on a device attached to the external microphone, or alternatively, the digitally signed document can be transmitted (step 360) by a device associated with the microphone, such as a telephone, a PC, or the like, to a remote computer system through the internet, the PSTN, or via any other transmission media, in order to cause the digitally signed document to be processed (step 370) for completing the identification as above and the certification of the originally keyed-in or uttered data.

The method of the current invention can utilize the well known DTMF telephony's standard for encoding and decoding the digital strings into and from sound respectively.

In accordance with further aspects of the present invention, a method as in the cases referred above wherein the method uses a chip card or smart card inserted into the cellular phone to store certain owner's secret key, and every time the cellular needs to compute the string, it reads the secret data (i.e., the private key) from the chip-card. Alternatively, the computation is completed in the Smart Card (i.e., the Hash function result encryption is made in the smart card itself and therefore he private key is not exposed).

A further variation of the method is a method as in the cases above but whereas the cellular uses the chip-card CPU to partially or totally compute the string. Although the invention has been described herein in conjunction the example of a cellular phone, with the explanation and examples mentioned above, those skilled in the art will appreciate that the scope of the invention includes also other personal devices which are portable like a PDA and the like.

Although the invention has been described herein in conjunction with the explanation and examples mentioned above, those skilled in the art will appreciate that the scope of the invention is not so limited. Various modifications in the selection and arrangement of the various components and method steps discussed herein may be made without departing from the spirit of the invention as set forth in the appended claims.

I claim:

1. A method for digitally signing data comprising the steps of:
    providing a cellular phone having capabilities to store a private key, to accept locally entered data from a user, to digitally sign the locally entered data using the private key such that one or more digital strings are produced; and to encode the digital strings to sound;
    directly entering the data, by the user, in the cellular phone;

computing, by the cellular phone, a digital signature of the data using the private key;

encoding, by the cellular phone, the digitally signed data to sound; and generating, by the cellular phone, the digitally signed data as acoustic sound waves.

2. The method of claim 1 further comprising the step of receiving the acoustic sound waves by an external microphone.

3. The method of claim 1, wherein the cellular phone further has the capability to accept the locally entered data by at least one of a keypad, as sound using speech recognition techniques, and as sound transmitted to and recorded by the cellular phone.

4. The method of claim 1, wherein the cellular phone has a speaker, and further comprising the step of encoding the digitally signed data to sound using the cellular phone speaker.

5. The method of claim 1, wherein the cellular phone further has the capability to generate the private key as well as a corresponding public key.

6. The method of claim 1, wherein the cellular phone uses an inserted chip-card for storing the private key.

7. The method of claim 1, wherein the cellular phone uses an inserted chip-card for computing the digital signature.

8. The method of claim 1 further comprising the steps of identifying the user of the cellular phone; and authorizing the use of the private key by biometrical means.

9. The method of claim 1 further comprising the steps of identifying the user of the cellular phone; and authorizing the use of the private key by requesting a personal identification number (PIN).

10. A method for facilitating a user to digitally sign data, the method comprising the steps of:

providing a cellular phone to the user, wherein the cellular phone has the capabilities to store a private key, to accept locally entered data directly from the user, to digitally sign the locally entered data using the private key such tat one or more digital strings are produced; and to encode the digital strings to sound; and providing remote access to a processing device, wherein the processing device retrieves and processes die encoded digital strings.

11. The method of claim 10 further comprising the steps of:

identifying the user of the cellular phone; and authorizing the use of the private key by biometrical means.

12. The method of claim 10 further comprising the steps of:

identifying the user of the cellular phone; and authorizing the use of the private key by requesting a personal identification number (PIN).

* * * * *